United States Patent
Saishu et al.

[11] Patent Number: 5,936,689
[45] Date of Patent: Aug. 10, 1999

[54] LIQUID CRYSTAL DISPLAY DEVICE

[75] Inventors: Tatsuo Saishu; Rieko Iida, both of Yokohama, Japan

[73] Assignee: Kabushiki Kaisha Toshiba, Kawasaki, Japan

[21] Appl. No.: 09/038,151

[22] Filed: Mar. 11, 1998

[30] Foreign Application Priority Data

Mar. 14, 1997 [JP] Japan ..................... 9-061030

[51] Int. Cl.⁶ .................. G02F 1/1337; G02F 1/141; G02F 1/1333; G09G 3/36
[52] U.S. Cl. .................. 349/123; 349/37; 349/138; 349/172; 345/97
[58] Field of Search .................. 349/172, 123, 349/138, 139, 37; 395/97

[56] References Cited

U.S. PATENT DOCUMENTS

| | | | |
|---|---|---|---|
| 4,927,242 | 5/1990 | Aoki et al. | 349/34 |
| 5,486,442 | 1/1996 | Takimoto et al. | 349/172 |
| 5,555,110 | 9/1996 | Konoma et al. | 345/97 |
| 5,729,314 | 3/1998 | Tsukamoto et al. | 349/123 |

FOREIGN PATENT DOCUMENTS

| | | |
|---|---|---|
| 63-311231 | 12/1988 | Japan . |
| 6-281953 | 10/1994 | Japan . |
| 6-281960 | 10/1994 | Japan . |
| 8-271906 | 10/1996 | Japan . |
| 8-328011 | 12/1996 | Japan . |

*Primary Examiner*—William L. Sikes
*Assistant Examiner*—Toan Ton
*Attorney, Agent, or Firm*—Finnegan, Henderson, Farabow, Garrett & Dunner, L.L.P.

[57] ABSTRACT

An active matrix type liquid crystal display device comprises a liquid crystal layer using liquid crystal of a chiral smectic C phase or its sub-phase as a liquid crystal material, pixel electrodes provided on one side of the liquid crystal layer, a common electrode provided on the other side of the liquid crystal layer, switching elements for supplying a predetermined electric potential to the pixel electrodes, and at least two insulation layers, which are provided between the pixel electrode and the liquid crystal layer and between the common electrode and the liquid crystal layer and which include at least alignment films, a sum of values (d/ε) obtained by dividing a thickness d [nm] of each insulation layer by a relative dielectric constant ε thereof at a frequency 1 kHz is set to be between 15 nm and 40 nm.

12 Claims, 4 Drawing Sheets

| TOTAL ALIGNMENT FILM THICKNESS [nm] | 20 | 40 | 60 | 80 | 100 | 120 | 140 | 160 | 180 |
|---|---|---|---|---|---|---|---|---|---|
| RELATIVE DIELECTRIC CONSTANT OF ALIGNMENT FILM (at 1 KHz) | 2.6 | | | | | | | | |
| Σ d/ε [nm]  (ALIGNMENT FILM & UNDERLYING LAYER) | 11 | 18 | 26 | 34 | 41 | 49 | 57 | 65 | 72 |
| CONTRAST RATIO (WRITE TIME 64 μs) | 52 | 72 | 103 | 81 | 60 | 51 | 39 | 27 | 15 |
| CONTRAST RATIO (WRITE TIME 32 μs) | 20 | 22 | 45 | 36 | 26 | 21 | 19 | 12 | 8 |

AT 6V APPLIED

| TOTAL ALIGNMENT FILM THICKNESS [nm] | 20 | 40 | 60 | 80 | 100 | 120 | 140 | 160 | 180 |
|---|---|---|---|---|---|---|---|---|---|
| RELATIVE DIELECTRIC CONSTANT OF ALIGNMENT FILM (at 1 KHz) | 2.6 | | | | | | | | |
| Σ d/ε [nm] (ALIGNMENT FILM & UNDERLYING LAYER) | 11 | 18 | 26 | 34 | 41 | 49 | 57 | 65 | 72 |
| CONTRAST RATIO (WRITE TIME 64 μs) | 52 | 72 | 103 | 81 | 60 | 51 | 39 | 27 | 15 |
| CONTRAST RATIO (WRITE TIME 32 μs) | 20 | 22 | 45 | 36 | 26 | 21 | 19 | 12 | 8 |

AT 6V APPLIED

FIG. 5

LIQUID CRYSTAL DISPLAY DEVICE

BACKGROUND OF THE INVENTION

The present invention relates to a liquid crystal display device using liquid crystal of chiral smectic C phase or its sub-phase such as ferroelectric liquid crystal or anti-ferroelectric liquid crystal as a liquid crystal material.

In order to improve a response speed and a viewing angle of TFT-LCD, various kinds of systems using the ferroelectric liquid crystal or anti-ferroelectric liquid crystal as its liquid crystal material have been studied. It is known that if the liquid crystal having their spontaneous polarization (or, more generally, the liquid crystal of chiral smectic C phase or its sub-phase) is driven by TFT, the depolarization field causes a holding voltage to be lowered when the response time of the liquid crystal is longer than the write-in time (for example, Hartmann: J. Appl. Phys. 66,1132(1989)). This lowering of the holding voltage is so called the shortage of writing, causing an effective applied voltage and a contrast ratio to be lower, which are serious problems in image quality.

Further, another problem occurs when the applied voltage is polarity-inverted in every frame and the driving (AC-driving) is carried out in positive/negative symmetrical modes. That is, when an absolute value of the signal voltage is varied at a certain frame or, in other words, when displayed images are changed, a phenomenon called "step response" that a steady state quantity of transmitted light is set after repeating bright state and dark state in a few frames, occurs (for example, Verhulst et al.: IDRC '94 digest, 377 (1994)).

When not a system of the symmetrical mode (AC driving), but a system of the asymmetrical mode (DC driving) (for example, Tanaka et al.: SID '94 digest, 430 (1994)) is employed, the "step response" does not occur and the contrast ratio is enhanced. However, the response becomes cumulative and the response speed becomes lower. This is also a phenomenon occurring as a result of the lowering of the holding voltage. The response speed becomes lower as the write-in time is shorter. Further, in the DC driving, there are problems such as image sticking caused by impurities and the afterimage caused by residual hysteresis.

As mentioned above, in both the symmetrical mode AC driving and the asymmetrical mode DC driving, the most important object for practice is to solve the two problems of the lowering of the holding voltage and the "step response".

From the viewpoint of the properties of the liquid crystal material, two measures to be taken, i.e. acceleration of the response speed and the lowering of the spontaneous polarization, are considered. These two problems can be solved by using a liquid crystal material whose response speed is sufficiently higher than that at the low voltage driving or at a temperature slightly lower than the room temperature and whose response time is shorter than the write-in time, but now there is no liquid crystal material satisfying these conditions. It is considered questionable whether the acceleration at a low temperature can be realized or not in future.

Further, the liquid crystal display device is required to be further enlarged in screen size and highly miniaturized in pixel size. For this purpose, however, the write-in time for one line inevitably needs to be shortened. Therefore, it is difficult to solve the above two problems within the limit of the response characteristic of the liquid crystal material.

Moreover, restricting the lowering of the holding voltage by reduction of the spontaneous polarization has been expected. However, the reduction of the spontaneous polarization theoretically brings about the lowering of the response speed and, as a result, the above two problems cannot be thereby solved. As described above, the only improvement of the properties of the liquid crystal material is inadequate as the measure to be taken to solve the two problems, i.e. the lowering of the holding voltage and the "step response".

Next, the measures which can be conceived from improvement of the driving method and the circuit structure will be considered. First, increase of the storage capacitance is considered. In an active matrix liquid crystal display element using general twisted nematic liquid crystal, the storage capacitance is substantially the same as the capacitance of pixels filled with the liquid crystal. By increasing the storage capacitance at ten or more times, the lowering of the holding voltage can be solved.

However, the "step response" cannot be solved unless the response speed of the liquid crystal material is substantially as low as the speed obtained at present. The quantity of current is also increased in accordance with the increase of the storage capacitance, which causes the power consumption to be increased and load on the driving circuit to be increased. Therefore, this measure is not considered applicable in practice, and the use is limited.

Further, as the measure to solve the "step response", a method of executing a resetting operation of writing voltage of approximately 0V immediately before the write and erasing or offsetting the preliminarily held charge, has been known. Driving methods using TFT or TFD have been announced, but part of the write-in time is assigned to the resetting operation in the driving methods. Therefore, the "step response" can be thereby solved. However, since the substantial write-in time is shortened unless the number of lines is reduced, the contrast is not adequately improved. In a case where the write-in time is shortened in accordance with high resolution, the write-in time is further shortened by the resetting operation, and shortage of the write becomes serious. If a circuit structure having two TFDs and two signal lines for each pixel is employed (for example, Verhulst et al.: IDRC '94 digest, 377 (1994)), the resetting operation can be executed during the write in other lines. In this structure, however, the number of the switching elements and lines for the respective pixels is increased, the driving waveform is complicated, and problems arise in relation to yield in the manufacture or manufacturing costs. In addition, a problem arises that with the TFD, irregularity in the properties of all the switching elements cannot easily be corrected and, therefore, this measure is not considered applicable in practice.

BRIEF SUMMARY OF THE INVENTION

The object of the present invention is to provide a liquid crystal display element capable of the high contrast and high-speed response.

In order to achieve this object, a liquid crystal display device of the present invention comprises:

a first substrate;

a plurality of scanning lines provided respectively for columns on the first substrate;

a plurality of signal lines provided respectively for rows on the first substrate;

a plurality of pixel electrodes on the first substrate, respectively, near points of intersection of the plurality of scanning lines and the plurality of signal lines;

a plurality of switching elements respectively inserted between the plurality of pixel electrodes and the plurality of signal lines, each of the plurality of switching elements comprising a conductive path and a control terminal for controlling the conductive path and conduction thereof, one end of the conductive path being connected to corresponding one of the plurality of pixel electrodes, the other end of the conductive path being connected to a corresponding one of the plurality of signal lines, the control terminal being connected to a corresponding one of the plurality of scanning lines;

a second substrate facing a surface of the first substrate on which the plurality of pixel electrodes are provided;

a common electrode provided on a surface of the second substrate, the surface opposing the first substrate;

a liquid crystal layer using liquid crystal of anyone of a chiral smectic C phase or its sub-phase, and being inserted between the first and the second substrate; and two or more insulation layers including an alignment film provided between the plurality of pixel electrodes and the liquid crystal layer and an alignment film layer provided between the common electrode and the liquid crystal layer, wherein a sum of values (d/$\epsilon$) obtained by dividing a thickness d [nm] of each of the two or more insulation layer by a relative dielectric constant $\epsilon$ of the each layer at a frequency 1 kHz is set to be between 15 nm and 40 nm.

The above two or more insulation layers include an underlying insulation film which is provided under either or each of the alignment films as occasion requires, other than the alignment films provided between the pixel electrode and the liquid crystal layer, and between the common electrode and the liquid crystal layer, respectively.

It is preferable that the sum of values (d/$\epsilon$) is set to be between 18 nm and 34 nm.

Preferably, the liquid crystal used for the liquid crystal layer is anyone of deformed helix ferroelectric liquid crystal and thresholdless anti-ferroelectric liquid crystal.

The liquid crystal display device has a function of allowing an image of one frame to be displayed when each of the plurality of signal lines supplies an image signal, the plurality of scanning lines supply scanning signals to sequentially drive the plurality of switching elements for respective columns and the driving of all of the plurality of scanning lines finish; and each of the plurality of signal lines has a function of supplying the image signal with a polarity inverted per a plurality of predetermined frames to a corresponding one of the plurality of pixel electrodes.

The plurality of signal lines further has a function of supplying the image signal with a polarity alternately different per each of the purality of signal lines.

Otherwise, the plurality of signal lines may further have a function of supplying the image signal with a polarity alternately different per each of the signal lines and supplying the image signal with a polarity inverted per each of the plurality of scanning lines.

Otherwise, the polarity of the image signal of each of the plurality of signal lines may be inverted in one or more of the scanning lines in each frame and the polarity of the image signal may be the same in each of the scanning lines over a period of the plurality of predetermined frames.

It is preferably that when the polarity of the image signal for arbitrary one of the plurality of signal lines is inverted, a corresponding one of the plurality of scanning lines supplies a pulse having a write-in time longer than a write-in time of the others of the scanning lines.

The inversion of the polarity of the image signal for each of the plurality of signal lines is continuously carried out for first predetermined frames, the inversion of the polarity is suspended in succeeding second predetermined frames, which are repeated cyclically.

It is preferable that the plurality of predetermined frames count 10 or more and 1000 or less.

When the liquid crystal of chiral smectic C phase or its sub-phase (typically, ferroelectric liquid crystal or anti-ferroelectric liquid crystal) is used as the liquid crystal material, the saturation voltage and the response speed of the liquid crystal display element show as much variation of the order as the thickness of the alignment film. As for the nematic liquid crystal, the alignment film having a thickness which is only one fiftieth as large as that of the liquid crystal layer as a typical value, is very larger in electric capacitance than the liquid crystal layer even if the difference in the relative dielectric constant is considered. Even if the thickness of the alignment film is varied at a few times, its influence to the saturation voltage and the response speed of the liquid crystal display element is small.

However, since the (anti-)ferroelectric liquid crystal has a spontaneous polarization Ps, the relative dielectric constant indicates a large value (ranging from a few tens to a few hundreds in accordance with the value of Ps) in the frequency and applied voltage range to which Ps responds. Therefore, the voltage applied to the liquid crystal layer and the alignment film, and the capacitance of each of them can be the same in order. As a result, the saturation voltage and the response speed depend greatly on the thickness of the alignment film. Electrically, both a generally used polyimide alignment film and an insulation film (inorganic insulation film or the like) formed as its underlying layer function as insulation layers. Therefore, both the alignment film and the underlying insulation film will be called as an insulation layer, hereinafter.

If the thickness of the insulation layer is made small and/or the dielectric constant thereof is made high to lower the saturation voltage, the light transmittance per unit applied voltage is increased and the high contrast can be obtained by the driving of a smaller voltage. However, if the thickness of the insulation layer is made further small and/or the dielectric constant thereof is made further high, reversely, the light transmittance per unit applied voltage is lowered and the contrast is also lowered. This is because the response speed is made lower since the capacitance of the insulation layer is increased due to the small thickness and/or the high dielectric constant and the series capacitance component of the liquid crystal cells is thereby increased.

As described above, if the thickness or the dielectric constant of the insulation layer is varied, the saturation voltage and the response speed are varied greatly. However, the saturation voltage and the response speed has a relationship of trade-off, and the practically important light transmittance per unit applied voltage has a maximum value (an optimal value) with a certain film thickness or dielectric constant. If the voltage of the driving system is constant, the highest contrast can be obtained at the optimal value. If the operating temperature is varied, the variation of the saturation voltage is very small, and the response speed is chiefly varied. Therefore, a thinner film has the optimal value at a high temperature at which the response speed gets higher. However, the above results are obtained under the condition that the initial alignment of the liquid crystal is not varied in accordance with the thickness of the insulation layer.

As a result of the above described study, it is found that when the liquid crystal material having the spontaneous polarization value and the response speed applicable for practical use is used, if the sum of the values (d/ϵ) obtained by dividing a thickness d of the respective insulation layers (alignment films, and underlying insulation film provided as occasion requires) by each relative dielectric constant ϵ is set in the above described range, the contrast per unit applied voltage is highest. This is the phenomenon that the present inventors found for the first time.

In order to realize the above range (the range of the sum of the values d/ϵ) with the relative dielectric constant of the generally used alignment film material and the underlying insulation film material, the film thickness needs to be smaller up to 30 nm. With this thinness, however, the manufacturing margin becomes small, and it is difficult to manufacture a large number of products having stable performances with a high yield. Therefore, in order to increase the manufacturing margin, it is preferable to form the alignment film and the underlying insulation film with the high dielectric constant material (for example, $Ta_2O_5$ for the insulation film) having the above described predetermined relative dielectric constant.

In addition, it is preferable that the liquid crystal material used for the liquid crystal layer is deformed helix ferroelectric liquid crystal or thresholdless anti-ferroelectric liquid crystal.

Of the liquid crystal of chiral smectic C phase or its sub-phase, the deformed helix ferroelectric liquid crystal or the thresholdless anti-ferroelectric liquid crystal having a linear characteristic with respect to brightness-voltage relation, a low driving voltage and a stable alignment, without showing a memory or hysteresis characteristics is most suitable as the liquid crystal material used for the liquid crystal display element having an active element. The bistable surface stabilized ferroelectric liquid crystal, the tristable surface stabilized anti-ferroelectric liquid crystal, the ferroelectric liquid crystal using the multi-domain state, the mono-stable ferroelectric liquid crystal of a long helical pitch, and the ferroelectric liquid crystal using the electro-clinic effect, which have been known, have only partially the above characteristics that the deformed helix ferroelectric liquid crystal and the thresholdless anti-ferroelectric liquid crystal have. That is why it is preferable to use the deformed helix ferroelectric liquid crystal or the thresholdless anti-ferroelectric liquid crystal as the liquid crystal material.

Also, in the liquid crystal display device using the deformed helix ferroelectric liquid crystal or the thresholdless anti-ferroelectric liquid crystal as the liquid crystal material, it is preferable to execute the AC driving including the resetting operation, i.e. the driving of the positive/negative symmetric mode that allows the polarity of the applied voltage to be inverted in every frame or the quasi-DC driving which allows the signal voltage of each pixel to be inverted in every plural frames, and, at the same time, any one of the horizontal line inversion, vertical line inversion and dot inversion.

In a case where the deformed helix ferroelectric liquid crystal or the thresholdless anti-ferroelectric liquid crystal in which the hysteresis does not disappear at all is used, the problem of "image sticking caused by the residual hysteresis" arises in the DC driving, and therefore, application of the AC driving is preferable. In addition, it is preferable to execute the above resetting operation for the purpose of solving the shortage of write and the "step response".

In a case where the deformed helix ferroelectric liquid crystal or the thresholdless anti-ferroelectric liquid crystal in which very tiny hysteresis occurs or no hysteresis occurs is used, application of the DC driving is possible since the problem of "image sticking caused by the residual hysteresis" does not arise in practical use. However, by the simple DC driving, image sticking caused by nonuniform distribution of impurities occurs. Therefore, it is preferable to execute the quasi-DC driving that allows the signal voltage of each pixel to be inverted for every plural frames, while disposing the polarizing film so as to display black when no voltage is applied.

The inversion of the respective pixels does not need to be executed simultaneously. In order to prevent the display disturbance from attracting attention at the inversion, it is often effective to invert the pixels at different timing in every area. Further, at the quasi-DC driving, asymmetry of the display caused by the polarities of write-in signals often attracts attention. In order to solve this, it is preferable to use any one of the horizontal line inversion, the vertical line inversion and the dot inversion together.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a table representing alignment film thickness dependence of contrasts;

FIG. 7A is a timing chart of a gate voltage; FIG. 7B is a timing chart of a signal voltage; FIG. 7C is a timing chart of a pixel write-in voltage; and FIG. 7D is a timing chart of a pixel holding voltage.

DETAILED DESCRIPTION OF THE INVENTION

Embodiments of the present invention will be described below with reference to the figures.

Figure 1:
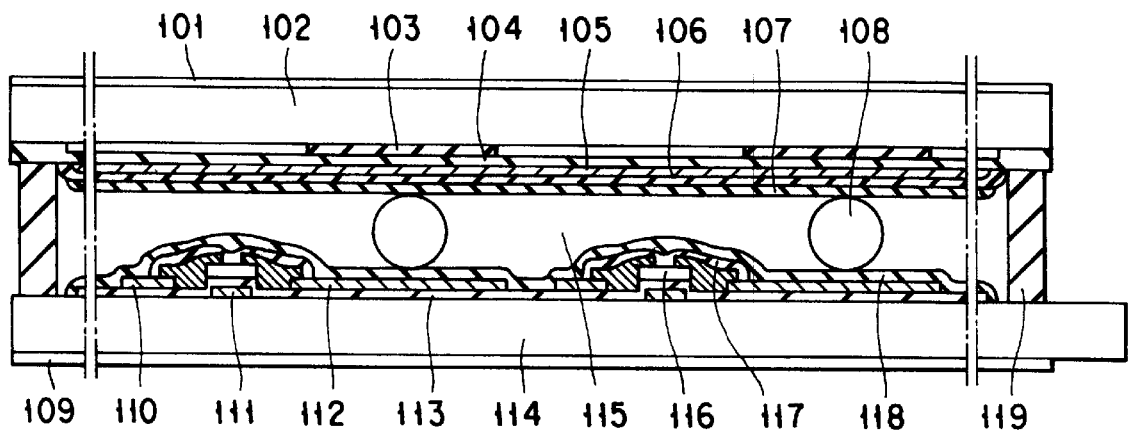
FIG. 1 is a sectional view of a liquid crystal display device according to embodiments of the present invention.
Figure 2:
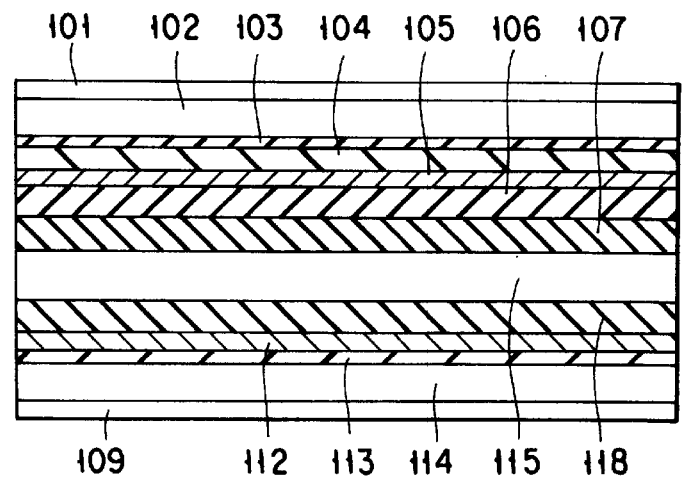
FIG. 2 is a sectional view showing a pixel portion of the liquid crystal display device shown in FIG. 1.

FIG. 1 is a sectional view of a liquid crystal display device of the present invention, and FIG. 2 is a sectional view of a pixel portion in the liquid crystal display device shown in FIG. 1.

Reference numeral 101 is a polarizing film; 102, a glass plate; 103, a color filter; 104, an overcoat layer (e.g. acrylic or polyimide resin layer); 105, an ITO common electrode; 106, an underlying insulation film (film thickness $d_1$, relative dielectric constant $\epsilon_1$); 107, an alignment film (film thickness $d_2$, relative dielectric constant $\epsilon_2$); 108, a spacer; 109, a polarizing film; 110, a signal line; 111, a TFT gate electrode; 112, an ITO pixel electrode; 113, a gate insulation layer; 114, a glass substrate; 115, a liquid crystal layer (formed of ferroelectric liquid crystal or anti-ferroelectric liquid crystal); 116, a TFT active layer; 117, a passivation layer; 118, an alignment film (film thickness $d_3$, relative dielectric constant $\epsilon_3$); and 119, an epoxy adhesive. The underlying film is formed of, for example, silicon oxide ($SiO_2$), silicon nitride (SiN), tantalum oxide ($Ta_2O_5$), titanium oxide based material ($SiTiO_3$, $TiO_2$, (Mg, Ca) $TiO_3$, $La_2Ti_2O_7$), Zirconium oxide ($ZrO_2$), lead oxide based material (PbO, Pb-Ti-O).

Embodiments of the liquid crystal display device having the structure shown in FIGS. 1 and 2 will be described below.

(FIRST EMBODIMENT)

A $Ta_2O_5$ thin film (with the relative dielectric constant ranging from 20 to 30) is formed by spattering as an underlying film having insulation property, so as to have the thickness of 75 nm, on a transparent electrode formed on a color filter substrate. Films of polyimide (AL1051: Japan Synthetic Rubber Co., Ltd., with the relative dielectric constant at 2.6, diluted by ACT-608) are formed as alignment films so that their total thickness can be set as represented in FIG. 5, on an array substrate on which many pixels are formed and the color filter substrate on which the underlying film is formed. More specifically, the polyimide resin is offset-printed on the array and color filter substrates to be baked at 90° C. 3 minutes by use of a hot plate and then at 200° C. 30 minutes in a nitrogen atmosphere. The polyimide film thus formed undergoes a rubbing processing with a cross rubbing angle of 5 degree. Then, spacer particles (2 μm diameter) are scattered on the substrate. The spacer particles are made of silica ($SiO_2$) particles coated with organic resin. An epoxy adhesive for the bonding is applied to predetermined positions between the upper and lower substrate surfaces. Thresholdless anti-ferroelectric liquid crystal (TLAF liquid crystal) TLAF-1 (Saishu et al.: see SID'96 digest, 703 (1996)) with a spontaneous polarization of 200 nC/cm², a response time of 150 μs and a saturation voltage of 6V, is injected into cells in a vacuum at 120° C. (as the liquid crystal material). This liquid crystal material has slight hysteresis in a curve of applied voltage-light transmittance. When the liquid crystal material is subjected to electric field application alignment process, in which pulses of 50 Hz, ±10V are applied while an ambient temperature is varied from 90° C. to a room temperature, a preferable initial alignment can be obtained. Also, a TFT driving system having the maximum applied voltage of ±6V and the selection time for one line of 64 or 32 μs is used.

Figure 6:
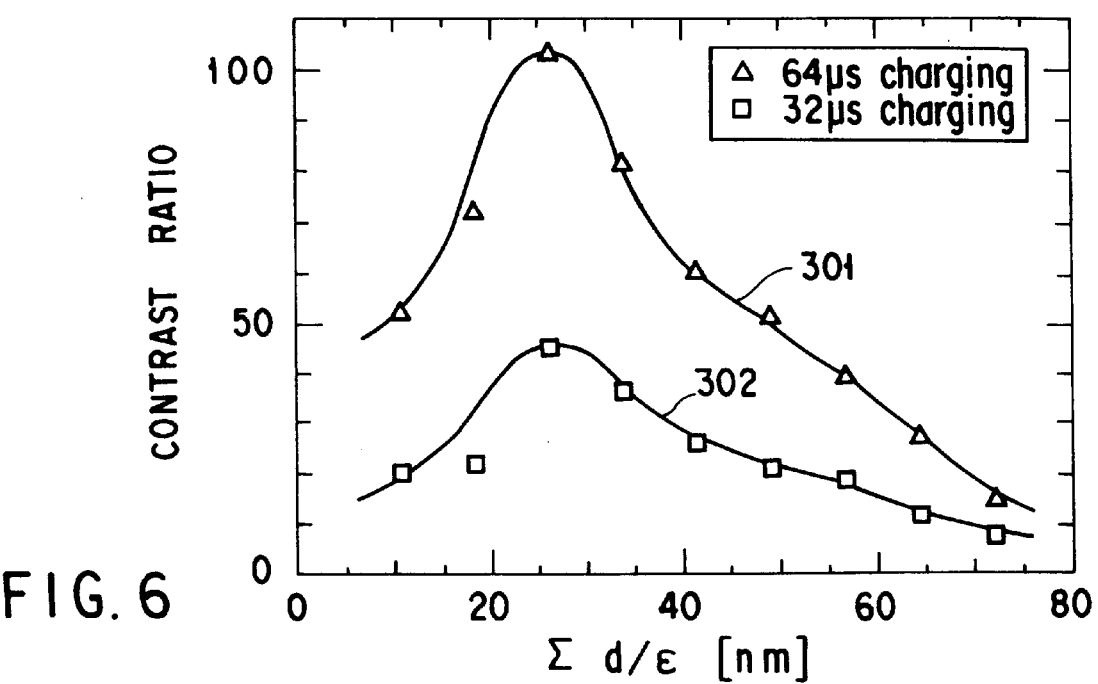
FIG. 6 is a graph representing $\Sigma d/\epsilon$ dependence of contrast ratio in the AC driving.
Figure 7A:
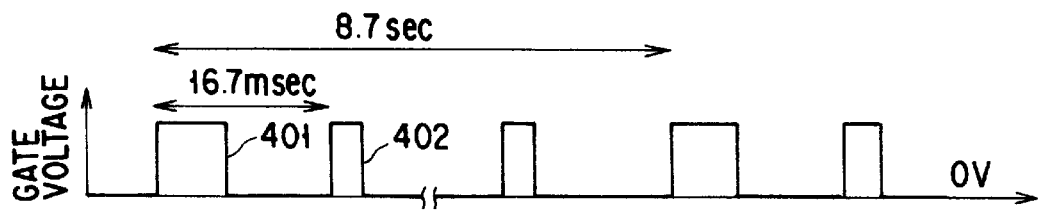
FIGS. 7A–7D are timing charts explaining an inversion method of a polarity of a pixel voltage in the quasi-DC driving.
Figure 7B:
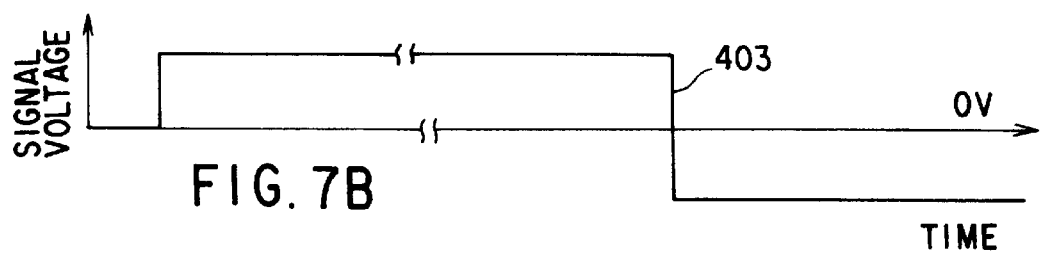
Figure 7C:
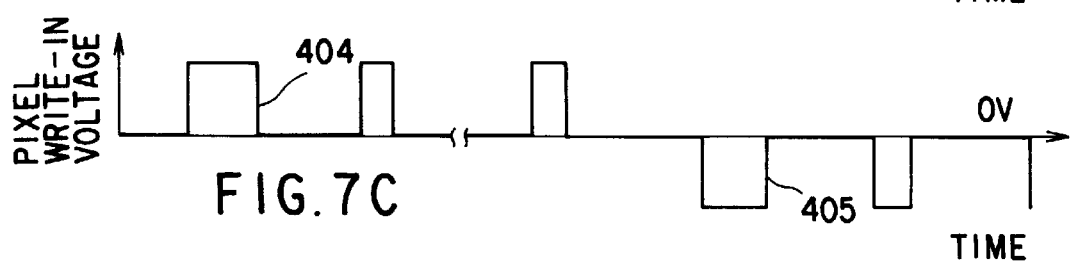
Figure 7D:
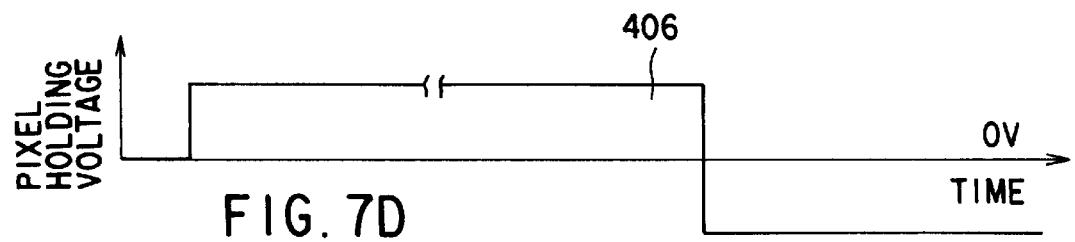

FIG. 5 represents the alignment film thickness dependence of the contrast obtained when the voltage of 6V is applied at the AC active matrix driving. When the film thickness is varied by the liquid crystal material used in the present embodiment, the initial alignment state (alignment state obtained when the voltage is not applied) does not have film thickness dependence and is preferable. As for the alignment film AL1051 having the relative dielectric constant of 2.6, the light transmittance and contrast per unit applied voltage become maximum under the condition that the alignment film thickness is 30 nm at each substrate. Since the value (d/$\epsilon$) of the underlying insulation film, which is the $Ta_2O_5$ film having the relative dielectric constant of 25 and the thickness of 75 nm is approximately 3 [nm], the sum $\Sigma(d/\epsilon)$ [nm] of the value (d/$\epsilon$) of both alignment films and that of the underlying insulation film will be represented at the value in the table. FIG. 6 shows the $\Sigma d/\epsilon$ dependence of the contrast.

Figure 3:
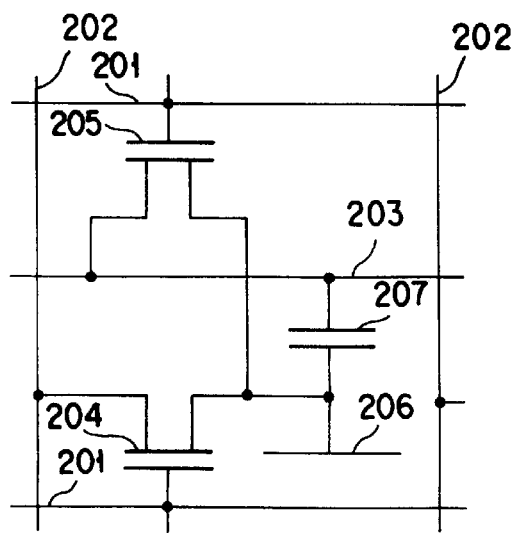
FIG. 3 is a view showing a circuit configuration when operations including a resetting operation simultaneously with writing in other lines are executed in the liquid crystal display device according to the embodiments of the present invention.
Figure 4:
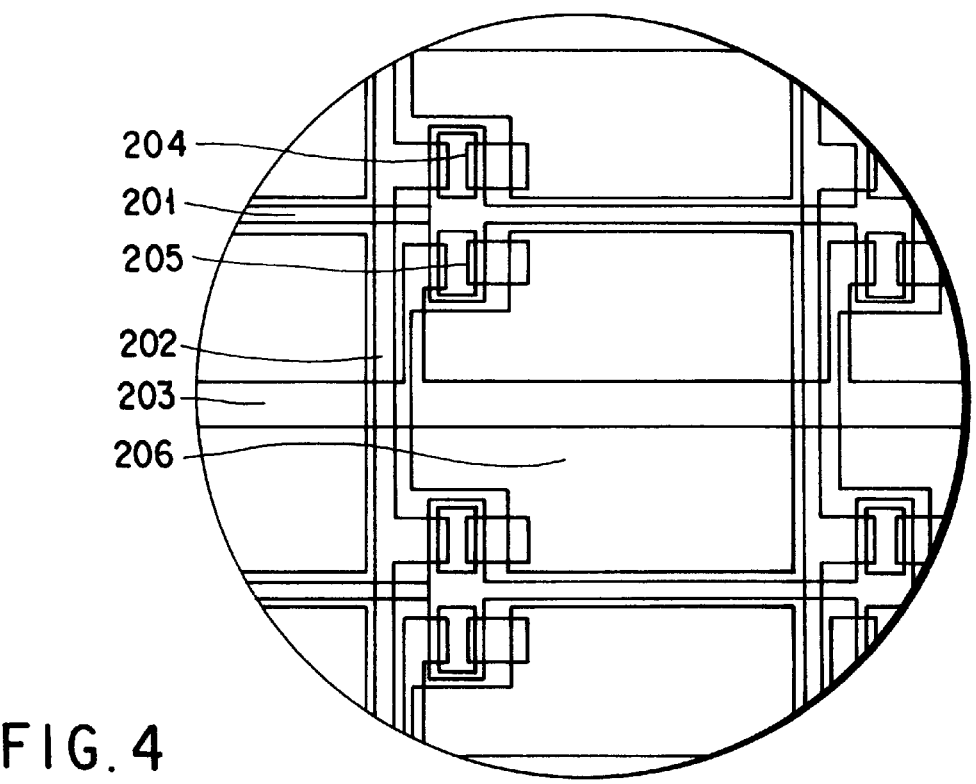
FIG. 4 is a view showing an array arrangement in relation to the circuit configuration shown in FIG. 3.

As for the cell in which the alignment film thickness is 30 nm in each substrate, the line-sequential driving is executed in the array arrangement shown in FIG. 4 having the circuit configuration of FIG. 3, so as to allow the write of image signals and the resetting operation of adjacent lines to be executed simultaneously. This driving method is effective for deletion of the step response. In FIGS. 3 and 4, reference numeral 201 denotes a scanning line; 202, a signal line; 203, a storage capacitance (Cs) line; 204, a TFT element for the write of image signals; 205, a TFT element for resetting; 206, an ITO pixel electrode; and 207, a storage capacitance. As a result, as shown in FIG. 5, the sufficient value of the contrast ratio can be obtained, i.e. the contrast ratio of 103 to 1 can be obtained when the write-in time is 64 μs and the contrast ratio of 45 to 1 when it is 32 μs, and no afterimage caused by the step response is recognized.

As a comparative example, a cell is formed under the same conditions as those of the first embodiment, except for use of $SiO_2$ as the material of the underlying insulation film having the thickness of 90 nm (with the relative dielectric constant of 4.5), and polyimide (AL1051) as the material of the alignment film having the thickness of 50 nm for each substrate. Under these conditions, the sum $\Sigma(d/\epsilon)$ of the value (d/$\epsilon$) of both alignment films and that of the underlying insulation film is 58 [nm], i.e. a large value. In this case, as described above, the saturation voltage is increased while the response speed becomes higher, and as a result, the quantity of the optical response and the contrast per unit applied voltage are reduced. Even the actual results obtained from the cell under these conditions teach that the contrast ratio is lowered to 40 to 1 when the write-in time is 64 μs. If the TFT driving system is changed to that having the maximum applied voltage at ±15V, the contrast ratio of 100 to 1 can be achieved, but the power consumption is augmented at five times, and it is difficult to put the liquid crystal display device of this type into practical use with respect to the reliability on the array and the manufacturing costs.

(SECOND EMBODIMENT)

The present embodiment employs a color filter opposite to the array substrate, in which the transparent electrode at portions facing the TFT element and the signal lines on the array substrate is removed by PEP, but the transparent electrode is formed only at the part other than the portions. A $SiO_2$ thin film (with the relative dielectric constant of 4.5) serving as an underlying film having insulation property is formed by spattering so as to have a thickness of 30 nm at the side of the color filter substrate contacting with the liquid crystal material. Since the underlying film is thin in this embodiment, the transparent electrode is patterned on the color filter substrate side for the purpose of preventing a short circuit from occurring between the substrates. Films of polyimide (AL3456: Japan Synthetic Rubber Co., Ltd., with the relative dielectric constant of 3.4) serving as alignment films are formed, in the same manner as in the first embodiment, on the array substrate and the color filter substrate on which the underlying film are formed, so that each of the films has a thickness of 30 nm, and then the polyimide films are thermally cured. The rubbing processing and the spacer particle (2 μm diameter) scattering as in the first embodiment is performed. An ultraviolet ray curable adhesive for sealing is applied to predetermined positions between the upper and lower substrate surfaces. Since the value (d/ε) of the underlying film formed of $SiO_2$ film with the relative dielectric constant of 4.5 and a thickness of 30 nm is approximately 7 [nm], the sum of the value (d/ε) of both alignment films and that of the underlying insulation film will be 25 [nm]. Thresholdless anti-ferroelectric liquid crystal (TLAF liquid crystal) (Fukuda: see ASIA Display '95 digest, 61 (1995)) with a spontaneous polarization of 200 $nC/cm^2$, a response time of 100 µs and a saturation voltage of 5V, is injected into cells at 120° C. in a vacuum as the liquid crystal material. This liquid crystal material hardly shows hysteresis in a curve of applied voltage-light transmittance. When the liquid crystal material is subjected to the electric field application alignment process, a preferable initial alignment can be obtained similarly to the case employing AL1051. Also, a TFT driving system for VGA having the maximum applied voltage of ±6V and the selection time for one line of 32 µs is used.

Figure 8:
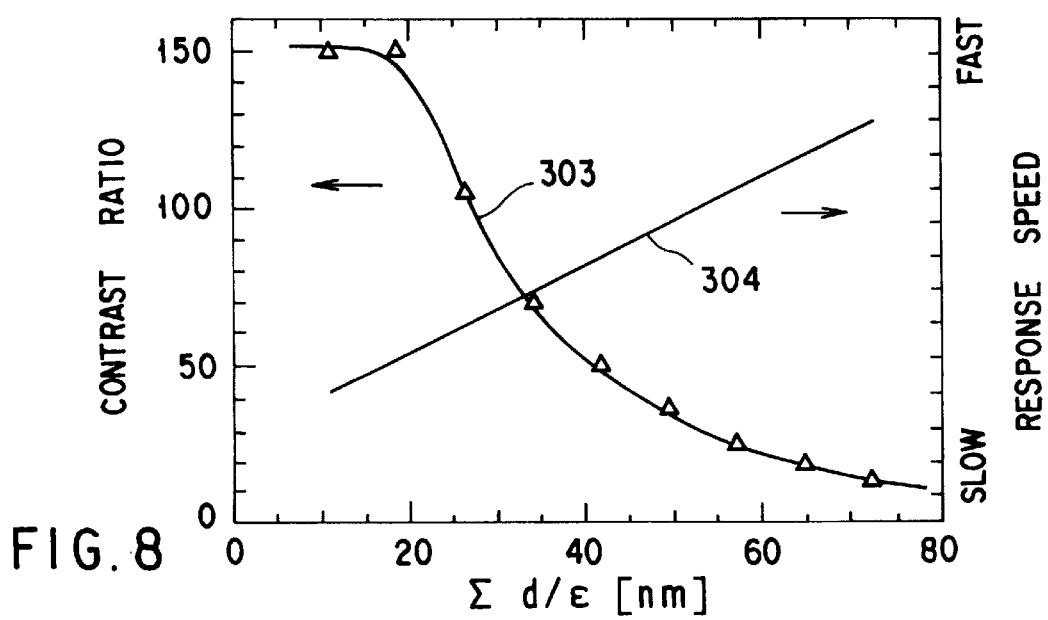
FIG. 8 is a graph representing the $\Sigma d/\epsilon$ dependence of the contrast ratio and response speed in the quasi-DC driving.

As shown in FIGS. 7A to 7D, quasi-DC driving in which a signal voltage 403 of each pixel is inverted only in every 520 frames (about 8.7 seconds) is carried out, and at the same time the dot inversion driving is carried out in the same array structure as that of the conventional TFT-TN type liquid crystal. The polarity inversion is not executed simultaneously in all the lines, but in every scanning line in each frame. The lowering of brightness can be visually recognized at the polarity inversion in accordance with the driving conditions. In this case, a driving method setting the time of a write-in pulse 401 of the only inverted line to be longer at ten times than the time (32 µs) of a write-in pulse 402 when it is in a non-inverted state, that is 320 µs, is employed. As a result, sufficient values, i.e. the contrast ratio at 100 to 1 and the response speed at 30 ms or lower, are obtained, and no afterimage or flicker caused by the cumulative response is recognized. Further, when cells with alignment films having a different thickness are produced and the similar driving is carried out at the cells, results shown in FIG. 8 are obtained in relation to the Σd/ε dependence of the contrast and the response speed.

The dot inversion driving is carried out at the same time in the above quasi-DC driving, but the signal line inversion driving may be carried out instead of the dot inversion driving. Further, the polarity inversion is carried out in every scanning line in each frame. However, it may be carried out in every two or more optional number of scanning lines. Besides, the signal line inversion driving and the non-inversion driving may be repeated with a predetermined interval in the time axis.

In addition, the polarity inversion is carried out in every 520 frames in the above quasi-DC driving, but the number of the frames may be between 10 and 1000. It is preferable to carry out the quasi-DC driving in the frames whose number is more than the ratio of the response time of the liquid crystal material to the pixel signal write-in time, in consideration of the response time of the liquid crystal. Therefore, the minimum number of the frames depends on the liquid crystal material, but it is preferable to set the number of the frames at 10 or more in the case of the (anti-) ferroelectric liquid crystal. The maximum number of the frames is preferable at 1000 or less in consideration of the image sticking, etc.

As a second comparative example, cells are produced under the same conditions as those of the second embodiment except for use of the underlying insulation film of $Ta_2O_5$ having a thickness at 30 nm. Since the value (d/ε) of the underlying film of $Ta_2O_5$ having the relative dielectric constant at 25 and the thickness at 30 nm is approximately 1 [nm], the sum Σ(d/ε) of the value (d/ε) of the alignment films of both sides and that of the underlyig insulation film will be 13 [nm], i.e. a small value. In this case, as described above, the response speed becomes lower though the saturation voltage is lowered, and as a result, the light transmittance for the unit applied voltage is lowered in one frame. According to the actual results with the cells having these conditions, the contrast ratio of 100 to 1 or more is obtained when the write-in time is 64 µs, but the response speed is lowered to 100 ms because of the lowering of the cumulative response characteristic as shown in FIG. 8. It is shown that this response speed is almost the same as that of the conventional TN type liquid crystal and that high speed response of the ferroelectric liquid crystal is lost under the conditions.

According to the present invention, relative to the ferroelectric liquid crystal and anti-ferroelectric liquid crystal comprising a conventional active element, shortage of writing can be solved and the high contrast display can be obtained at a low voltage, and the response speed can be enhanced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A liquid crystal display device, comprising:

a first substrate;

a plurality of scanning lines provided respectively for columns on the first substrate;

a plurality of signal lines provided respectively for rows on the first substrate;

a plurality of pixel electrodes on the first substrate, respectively, near points of intersections of the plurality of scanning lines and the plurality of signal lines;

a plurality of switching elements respectively inserted between the plurality of pixel electrodes and said plurality of signal lines, each of said plurality of switching elements comprising a conductive path and a control terminal for controlling said conductive path and conduction thereof, one end of said conductive path being connected to corresponding one of said plurality of pixel electrodes, the other end of said conductive path being connected to a corresponding one of said plurality of signal lines, the control terminal being connected to a corresponding one of said plurality of scanning lines;

a second substrate facing a surface of said first substrate on which said plurality of pixel electrodes are provided;

a common electrode provided on a surface of said second substrate, said surface opposing said first substrate;

a liquid crystal layer using liquid crystal of anyone of a chiral smectic C phase and a sub-phase thereof, and being inserted between said first and said second substrate; and two or more insulation layers including an alignment film provided between said plurality of pixel electrodes and said liquid crystal layer and an alignment film layer provided between said common electrode and said liquid crystal layer, wherein a sum of values (d/ϵ) obtained by dividing a thickness d [nm] of each of said two or more insulation layers by a relative dielectric constant ϵ of each of said layers at a frequency 1 kHz is set to be between 15 nm and 40 nm.

2. A liquid crystal display device according to claim 1, wherein said sum of values (d/ϵ) is set to be between 18 nm and 34 nm.

3. A liquid crystal display device according to claim 1, wherein liquid crystal used for said liquid crystal layer is anyone of deformed helix ferroelectric liquid crystal and thresholdless anti-ferroelectric liquid crystal.

4. A liquid crystal display device according to claim 1, wherein said liquid crystal display device has a function of allowing an image of one frame to be displayed when each of said plurality of signal lines supplies an image signal, said plurality of scanning lines supply scanning signals to sequentially drive said plurality of switching elements for respective columns and the driving of all of said plurality of scanning lines finish; and each of said plurality of signal lines has a function of supplying said image signal with a polarity inverted per a plurality of predetermined frames to a corresponding one of said plurality of pixel electrodes.

5. A liquid crystal display device according to claim 4, wherein said plurality of signal lines further has a function of supplying said image signal with a polarity alternately different per each of said plurality of signal lines.

6. A liquid crystal display device according to claim 5, wherein when said polarity of said image signal for arbitrary one of said plurality of signal lines is inverted, a corresponding one of said plurality of scanning lines supplies a pulse having a write-in time longer than a write-in time of the others of said scanning lines.

7. A liquid crystal display device according to claim 4, wherein said plurality of signal lines further have a function of supplying said image signal with a polarity alternately different per each of said plurality of signal lines and supplying said image signal with a polarity inverted per each of said plurality of scanning lines.

8. A liquid crystal display device according to claim 7, wherein when said polarity of said image signal for arbitrary one of said plurality of signal lines is inverted, a corresponding one of said plurality of scanning lines supplies a pulse having a write-in time longer than a write-in time of the others of said scanning lines.

9. A liquid crystal display device according to claim 4, wherein said polarity of said image signal of each of said plurality of signal lines is inverted in one or more of said scanning lines in each frame and said polarity of said image signal is the same in each of said scanning lines over a period of said plurality of predetermined frames.

10. A liquid crystal display device according to claim 9, wherein when said polarity of said image signal for arbitrary one of said plurality of signal lines is inverted, a corresponding one of said plurality of scanning lines supplies a pulse having a write-in time longer than a write-in time of the others of said scanning lines.

11. A liquid crystal display device according to claim 9, wherein the inversion of said polarity of said image signal for each of said plurality of signal lines is continuously carried out for first predetermined frames, said inversion of said polarity is suspended in succeeding second predetermined frames, which are repeated cyclically.

12. A liquid crystal display device according to claim 4, wherein said plurality of predetermined frames count 10 or more and 1000 or less.

\* \* \* \* \*